July 23, 1929.  T. V. BUCKWALTER  1,722,035
TRUCK
Filed Nov. 10, 1927    2 Sheets-Sheet 1
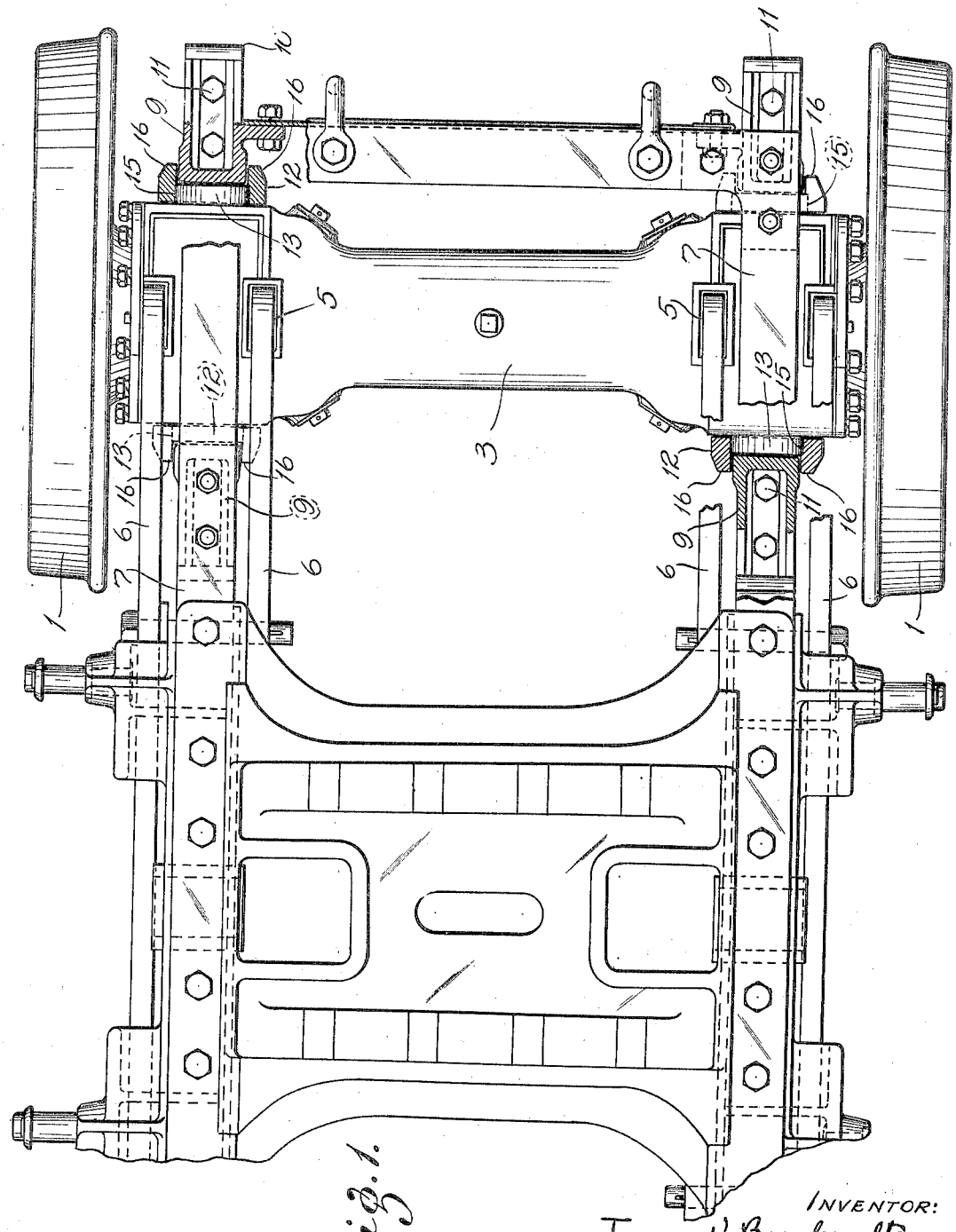

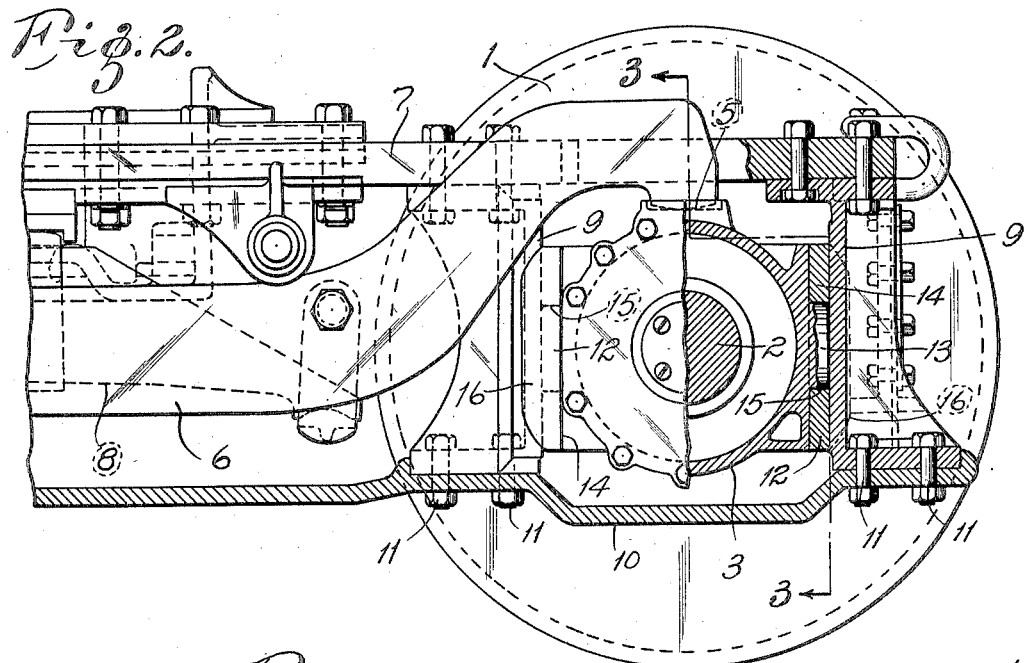
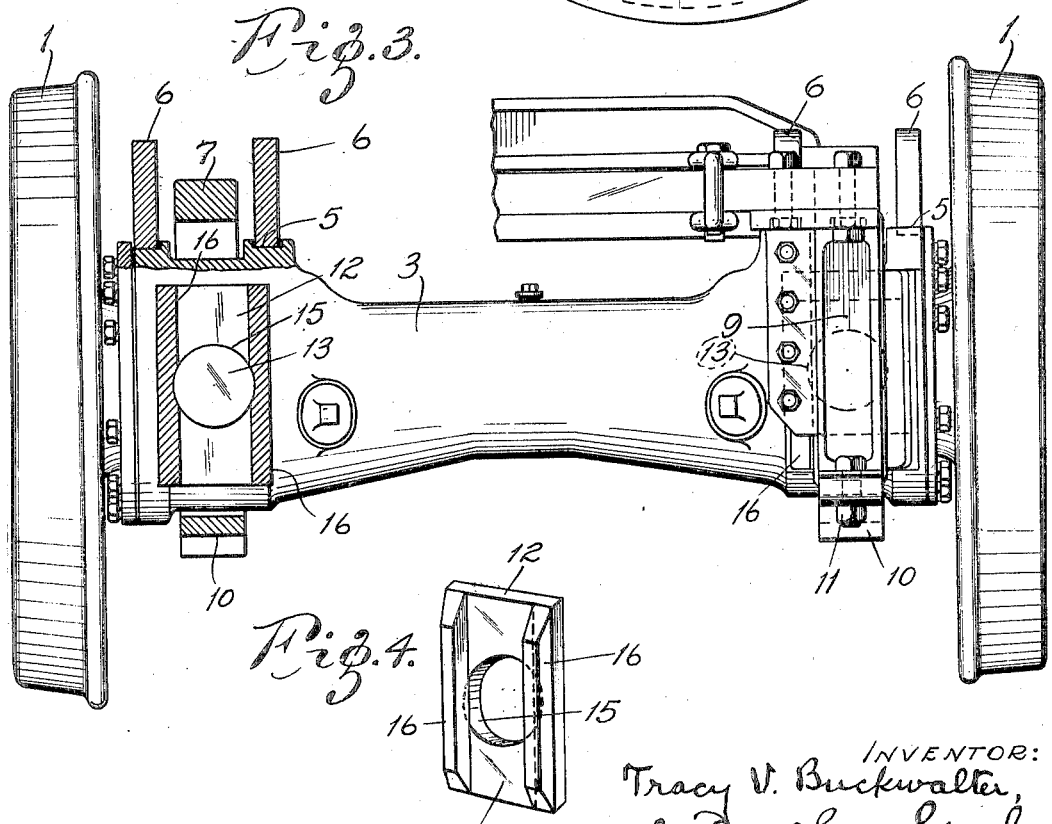
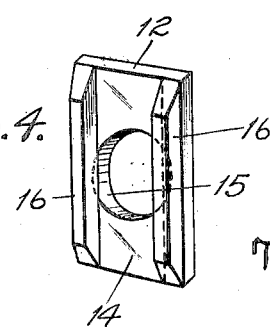

Patented July 23, 1929.

1,722,035

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

TRUCK.

Application filed November 10, 1927. Serial No. 232,269.

My invention relates to trucks, especially trucks of the kind commonly designated as locomotive trucks, but is also applicable to other types of trucks such as passenger car trucks and freight car trucks.

The principal object of the invention is to provide for such limited movement of the axle relative to the pedestal as may be needed to accommodate the truck construction to irregularities of the railway track; and to devise a simple and durable construction suitable for such purpose. It consists principally in mounting guides for the pedestals in such manner that the axle may tilt endwise without affecting the vertical position of the guides. It also consists in the arrangements and combinations of parts hereinafter described and claimed.

In the accompanying drawing, wherein like numerals refer to like parts wherever they occur, Fig. 1 is a plan view of part of a truck embodying my invention, with certain portions shown in horizontal section, Fig. 2 is a longitudinal view partly in elevation and partly in section, Fig. 3 is a front view partly in elevation and partly in vertical section on the line 3—3 in Fig. 2; and Fig. 4 is a perspective view of the guide block.

The drawing represents a truck of the so-called inboard type, wherein the axle is equipped with roller bearings. According to this construction, the wheels 1 are rigidly secured to the axle 2, which is located inside of a fixed housing 3, with roller bearings interposed between the axle and the housing. The top 5 of each end portion of the housing has a substantially flat surface adapted to constitute seats for equalizer 6, whose end portions are convexed endwise to bear on said seats and have a rocking contact therewith.

The frame 7 of the truck illustrated is supported on springs 8 which in turn are supported by the equalizers. The frame extends above the housing and has the usual downwardly extending pedestals 9 extending on opposite sides of the axle housing. In the constructions shown, the horns of the pedestal are connected together and to the horns of an adjacent pedestal by a pedestal brace tie bar 10 secured thereto by suitable bolts 11.

In lieu of the fixed guides commonly used for guiding the pedestals, the pedestal guides 12 of the present construction are pivotally mounted on horizontal trunnions 13 that extend laterally from the sides of the axle housing and are preferably made integral therewith. Each of these guides is in the form of an elongated block 14 with a bearing hole 15 for the trunnion and with longitudinal ribs 16 along the sides of one face. The inner faces of the ribs are finished as straight guide-faces to adapt them for sliding contact with the pedestals. In other respects, the truck may conform to any ordinary design as the present invention is not concerned with other details of construction.

From the foregoing description, it is obvious that when one of the wheels of the truck comes to a low joint in the railway track, it is free to go down without regard to the other wheels of the truck. In such case, the wheel above the low joint in the track goes down, while the opposite wheel on the same axle remains at the normal level or may go up or down as occasion may require. In doing so, the axle itself together with its housing becomes slightly tilted endwise, which action is accommodated by a rotary or pivotal movement of the trunnions relative to the respective guide blocks that cooperate therewith. Such guide blocks are held in substantially vertical position by the horns of the respective pedestals, which are free to slide up and down thereon. It is noted that all of these movements are provided for by parts that are free to accommodate themselves to whatever positions may be imposed thereon, so that no portion of the structure is subject to undue stress or is submitted to undue wear.

While I have illustrated and described my invention as applied to the type of truck commonly designated as a locomotive truck, it is obviously applicable to other types of trucks, such as passenger car trucks and freight car trucks that usually dispense with equalizers. Likewise, it is obvious that instead of forming the trunnions on the axle housing and the trunnion holes in the guide blocks, the trunnions may be formed on the guide blocks and the trunnion holes in the axle housing. While the invention is illustrated in connection with an inboard truck, wherein the live axle is mounted in a stationary housing, it is also applicable to outboard trucks, in which case the guide blocks are pivotally mounted on the journal boxes after the manner above described with reference to the housing of an inboard truck. It is also applicable to constructions wherein the axle is fixed or stationary and the wheels turn thereon, in which case the guide blocks are pivotally mounted on the axle or a member secured thereto.

What I claim is:

1. The combination of a live axle with wheels at its ends, a housing for said axle, guide blocks rotatably mounted on the end portions of said housings, a truck frame supported by said housing and having pedestals movable on saide guide blocks respectively.

2. The combination of a live axle with wheels at its ends, a housing for said axle having trunnions extending laterally from the end portions thereof, guide blocks journaled on said trunnions, a truck frame supported by said housing and having pedestals movable on said guide blocks respectively.

3. A truck comprising a frame member having pedestals, live axles having wheels at their ends, housings in which the respective axles are journaled and on which the load is supported, each housing having trunnions extending laterally from its end portions, and guide blocks journaled on the respective trunnions and slidably engaging the respective pedestals.

4. A truck comprising equalizer members, springs supported thereby and a frame member supported by said springs and having pedestals, live axles having wheels at their ends, housings in which the respective axles are journaled and on which the equalizer members are supported, each housing having trunnions extending laterally from its end portions, and guide blocks journaled on the respective trunnions and slidably engaging the respective pedestals.

Signed at Canton, Ohio, this 2d day of November, 1927.

TRACY V. BUCKWALTER.